(12) United States Patent
Przybylski et al.

(10) Patent No.: US 11,099,530 B2
(45) Date of Patent: Aug. 24, 2021

(54) CENTRAL PLANT CONTROL SYSTEM WITH DEVICE GEOMETRIC MODELING AND CONTROL

(71) Applicant: Johnson Controls Technology Company, Auburn Hills, MI (US)

(72) Inventors: Andrew J. Przybylski, Franksville, WI (US); John H. Burroughs, Wauwatosa, WI (US); Michael J. Wenzel, Grafton, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/549,931

(22) Filed: Aug. 23, 2019

(65) Prior Publication Data

US 2021/0055698 A1 Feb. 25, 2021

(51) Int. Cl.
*G05B 13/04* (2006.01)
*F24F 11/63* (2018.01)
*F24F 11/49* (2018.01)
*F24F 11/89* (2018.01)
*G06F 17/11* (2006.01)

(52) U.S. Cl.
CPC .......... *G05B 13/041* (2013.01); *F24F 11/49* (2018.01); *F24F 11/63* (2018.01); *F24F 11/89* (2018.01); *G06F 17/11* (2013.01)

(58) Field of Classification Search
CPC ......... G05B 13/041; F24F 11/49; F24F 11/89; F24F 11/63; G06F 17/11
See application file for complete search history.

(56) References Cited

U.S. PATENT DOCUMENTS

| 5,497,452 A | 3/1996 | Shimizu et al. |
| 7,123,254 B2 | 10/2006 | Toyama et al. |
| 7,580,775 B2 | 8/2009 | Kulyk et al. |

(Continued)

OTHER PUBLICATIONS

U.S. Appl. No. 15/900,459, filed Feb. 20, 2018, Johnson Controls Technology Company.

(Continued)

*Primary Examiner* — Charles R Kasenge
(74) *Attorney, Agent, or Firm* — Foley & Lardner LLP

(57) ABSTRACT

A method for operating a subplant included in a central plant includes obtaining instruction-based equipment models associated with devices included in the subplant and comprises operating points that define an operation of the devices, generating, for each instruction-based equipment models, a geometric equipment model using the operating points from a particular instruction-based equipment model, the geometric equipment model defining at least one operating domain associated with the particular device, merging geometric equipment models to form a geometric subplant model, the geometric subplant model defining an operation of the subplant comprising devices associated with the geometric equipment models, receiving a desired operating point comprising a load value, determining, relative to the desired operating point, a nearest operating point on the geometric subplant model, setting the nearest operating point on the geometric subplant model as an actual operating point, and operating the subplant at the actual operating point for the subplant.

20 Claims, 11 Drawing Sheets

(56) References Cited

U.S. PATENT DOCUMENTS

| | | | |
|---|---|---|---|
| 7,894,946 B2 | 2/2011 | Kulyk et al. | |
| 8,229,579 B2 | 7/2012 | Eldridge et al. | |
| 8,473,080 B2 | 6/2013 | Seem et al. | |
| 8,527,108 B2 | 9/2013 | Kulyk et al. | |
| 8,527,109 B2 | 9/2013 | Kulyk et al. | |
| 8,786,409 B2 * | 7/2014 | Zwart | G06F 3/04886 340/12.1 |
| 8,918,223 B2 | 12/2014 | Kulyk et al. | |
| 9,002,532 B2 | 4/2015 | Asmus | |
| 9,110,647 B2 | 8/2015 | Kulyk et al. | |
| 9,235,657 B1 | 1/2016 | Wenzel et al. | |
| 9,429,923 B2 | 8/2016 | Ward et al. | |
| 9,436,179 B1 | 9/2016 | Turney et al. | |
| 9,514,570 B2 * | 12/2016 | Keating | H04N 7/185 |
| 9,612,601 B2 | 4/2017 | Beyhaghi et al. | |
| 9,696,054 B2 | 7/2017 | Asmus | |
| 9,703,339 B2 | 7/2017 | Kulyk et al. | |
| 9,778,639 B2 | 10/2017 | Boettcher et al. | |
| 9,852,481 B1 | 12/2017 | Turney et al. | |
| 9,982,903 B1 | 5/2018 | Ridder et al. | |
| 10,001,792 B1 * | 6/2018 | Packer | G05D 23/1904 |
| 10,007,259 B2 | 6/2018 | Turney et al. | |
| 10,088,814 B2 | 10/2018 | Wenzel et al. | |
| 10,094,586 B2 | 10/2018 | Pavlovski et al. | |
| 10,101,730 B2 | 10/2018 | Wenzel et al. | |
| 10,101,731 B2 | 10/2018 | Asmus et al. | |
| 10,139,877 B2 | 11/2018 | Kulyk et al. | |
| 10,175,681 B2 | 1/2019 | Wenzel et al. | |
| 10,190,789 B2 | 1/2019 | Mueller et al. | |
| 10,943,301 B1 | 3/2021 | Wu et al. | |
| 2014/0028712 A1 * | 1/2014 | Keating | G06T 7/246 345/633 |
| 2014/0028713 A1 * | 1/2014 | Keating | G06F 3/0304 345/633 |
| 2014/0028850 A1 * | 1/2014 | Keating | G06T 7/246 348/158 |
| 2015/0316901 A1 | 11/2015 | Wenzel et al. | |
| 2015/0316907 A1 | 11/2015 | Elbsat et al. | |
| 2016/0313751 A1 | 10/2016 | Risbeck et al. | |
| 2016/0377306 A1 | 12/2016 | Drees et al. | |
| 2017/0031962 A1 | 2/2017 | Turney et al. | |
| 2017/0102162 A1 | 4/2017 | Drees et al. | |
| 2017/0103483 A1 | 4/2017 | Drees et al. | |
| 2017/0104336 A1 | 4/2017 | Elbsat et al. | |
| 2017/0104342 A1 | 4/2017 | Elbsat et al. | |
| 2017/0104343 A1 | 4/2017 | Elbsat et al. | |
| 2017/0179716 A1 | 6/2017 | Vitullo et al. | |
| 2017/0212488 A1 | 7/2017 | Kummer et al. | |
| 2017/0241658 A1 | 8/2017 | Salsbury et al. | |
| 2018/0004171 A1 | 1/2018 | Patel et al. | |
| 2018/0004172 A1 | 1/2018 | Patel et al. | |
| 2018/0004173 A1 | 1/2018 | Patel et al. | |
| 2018/0011459 A1 | 1/2018 | Boettcher et al. | |
| 2018/0075549 A1 | 3/2018 | Turney et al. | |
| 2018/0196456 A1 | 7/2018 | Elbsat | |
| 2018/0197253 A1 | 7/2018 | Elbsat et al. | |
| 2018/0209674 A1 | 7/2018 | Ridder et al. | |
| 2018/0209675 A1 | 7/2018 | Ridder | |
| 2018/0254632 A1 | 9/2018 | Elbsat et al. | |
| 2018/0259918 A1 | 9/2018 | Asmus et al. | |
| 2018/0285800 A1 | 10/2018 | Wenzel et al. | |
| 2018/0306459 A1 | 10/2018 | Turney | |
| 2018/0313563 A1 | 11/2018 | Turney et al. | |
| 2018/0314220 A1 | 11/2018 | Kumar et al. | |
| 2018/0341255 A1 | 11/2018 | Turney et al. | |
| 2018/0356770 A1 | 12/2018 | Elbsat et al. | |
| 2018/0356782 A1 | 12/2018 | Elbsat et al. | |
| 2018/0357577 A1 | 12/2018 | Elbsat et al. | |
| 2019/0011145 A1 | 1/2019 | Willmott et al. | |
| 2019/0020203 A1 | 1/2019 | Lang et al. | |
| 2019/0025774 A1 | 1/2019 | Wenzel et al. | |
| 2019/0032942 A1 | 1/2019 | Willmott et al. | |
| 2019/0032943 A1 | 1/2019 | Willmott et al. | |
| 2019/0032944 A1 | 1/2019 | Wenzel et al. | |
| 2019/0032945 A1 | 1/2019 | Willmott et al. | |
| 2019/0032947 A1 | 1/2019 | Willmott et al. | |
| 2019/0032949 A1 | 1/2019 | Willmott et al. | |
| 2019/0066236 A1 | 2/2019 | Wenzel | |
| 2019/0079473 A1 | 3/2019 | Kumar et al. | |
| 2019/0107825 A1 | 4/2019 | Wenzel et al. | |
| 2019/0163213 A1 | 5/2019 | Ostrye et al. | |
| 2019/0163216 A1 | 5/2019 | Ostrye | |
| 2019/0213695 A1 | 7/2019 | Elbsat et al. | |
| 2019/0219293 A1 | 7/2019 | Wenzel et al. | |
| 2019/0245368 A1 | 8/2019 | Baumgartner et al. | |
| 2019/0257544 A1 | 8/2019 | Alanqar et al. | |
| 2019/0286114 A1 | 9/2019 | Przybylski et al. | |
| 2019/0303830 A1 | 10/2019 | Wenzel et al. | |
| 2019/0316802 A1 | 10/2019 | Alanqar et al. | |
| 2020/0242849 A1 * | 7/2020 | Cini | G06T 7/73 |
| 2020/0258157 A1 * | 8/2020 | Law | G06Q 40/04 |

OTHER PUBLICATIONS

U.S. Appl. No. 15/921,955, filed Mar. 15, 2018, Johnson Controls Technology Company.
U.S. Appl. No. 15/953,324, filed Apr. 13, 2018, Johnson Controls Technology Company.
U.S. Appl. No. 16/040,698, filed Jul. 20, 2018, Johnson Controls Technology Company.
U.S. Appl. No. 16/178,361, filed Nov. 1, 2018, Johnson Controls Technology Company.
U.S. Appl. No. 16/223,746, filed Dec. 18, 2018, Johnson Controls Technology Company.
U.S. Appl. No. 16/223,901, filed Dec. 18, 2018, Johnson Controls Technology Company.
U.S. Appl. No. 16/240,028, filed Jan. 4, 2019, Alanqar et al.
U.S. Appl. No. 16/240,466, filed Jan. 4, 2019, Johnson Controls Technology Company.
U.S. Appl. No. 16/294,475, filed Mar. 6, 2019, Johnson Controls Technology Company.
U.S. Appl. No. 16/294,490, filed Mar. 6, 2019, Johnson Controls Technology Company.

* cited by examiner

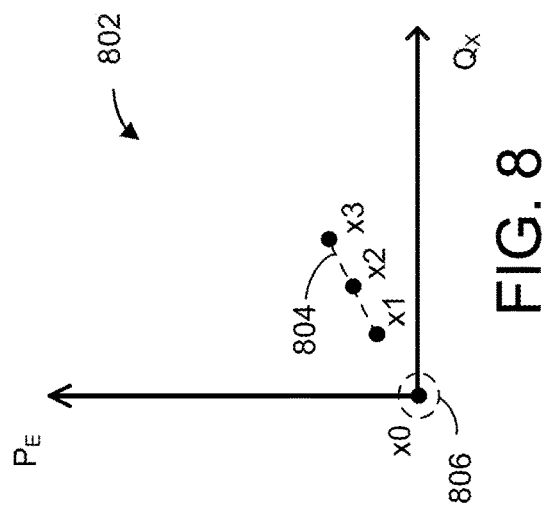
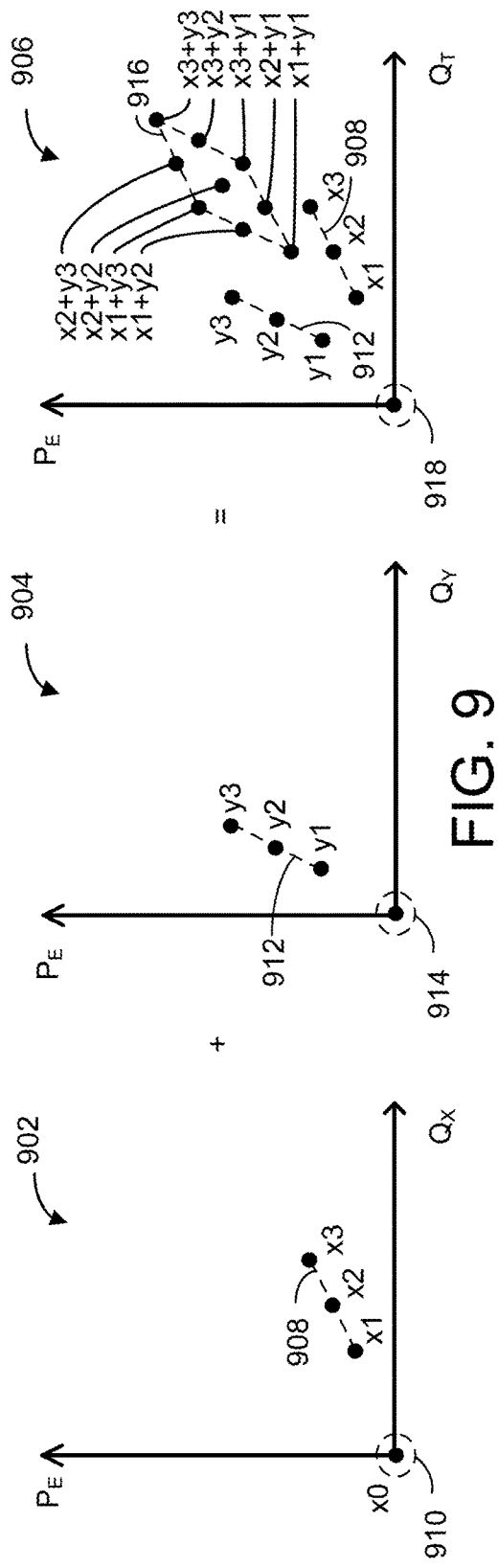
FIG. 8
FIG. 9

CENTRAL PLANT CONTROL SYSTEM WITH DEVICE GEOMETRIC MODELING AND CONTROL

BACKGROUND

The present disclosure relates generally to a central plant or central energy facility configured to serve the energy loads of a building or campus. The present disclosure relates more particular to a central plant with an asset allocator configured to determine a distribution of energy loads across various subplants of the central plant based on geometric models of the devices included in the subplants.

A central plant typically include multiple subplants configured to serve different types of energy loads. For example, a central plant may include a chiller subplant configured to serve cooling loads, a heater subplant configured to serve heating loads, and/or an electricity subplant configured to serve electric loads. Each subplant may have one or more devices configured to serve each subplant. A central plant purchases resources from utilities to run the subplants to meet the loads.

A central plant uses models of the equipment in the central plant in order to determine operating points for each piece of equipment. It can be difficult and time-consuming for a user to generate the models for a central plant.

SUMMARY

One implementation of the present disclosure is a method for operating a subplant included in a central plant. The method includes obtaining instruction-based equipment model associated with a particular device included in the subplant and comprises operating points that define an operation of the particular device, generating, for each instruction-based equipment models, a geometric equipment model using the operating points from a particular instruction-based equipment model, the geometric equipment model defining at least one operating domain associated with the particular device, merging geometric equipment models to form a geometric subplant model, the geometric subplant model defining an operation of the subplant comprising devices associated with the geometric equipment models, receiving a desired operating point comprising a load value, determining, relative to the desired operating point, a nearest operating point on the geometric subplant model, setting the nearest operating point on the geometric subplant model as an actual operating point, and operating the subplant at the actual operating point for the subplant.

In some embodiments, the method involves repeating the obtaining, generating, merging, receiving, determining, and setting steps for the subplants included in the central plant to determine the actual operating point for each subplant.

In some embodiments, generating the geometric equipment model comprises using time-series data points to generate the geometric equipment model.

In some embodiments, the time-series data points further comprises grouping data gathered from a real-time data collection process.

In some embodiments, merging the geometric equipment models to form the geometric subplant model further comprises summing each operating point included in the geometric equipment models.

In some embodiments, the method involves defining destinations of an amount of a particular resource produced by the subplant by appointing a portion of the amount to each destination. A summation of each portion is the amount of the particular resource.

In some embodiments, determining the nearest operating point on the geometric subplant model further comprises determining a Euclidean distance value between the desired operating point and each of the plurality of operating points included in the geometric subplant model.

In some embodiments, determining the nearest operating point on the geometric subplant model further comprises determining an operating point with a minimum Euclidean distance value.

Another implementation of the present disclosure is a controller for subplants comprising devices. The controller includes a geometric modeling module configured to generate a geometric equipment model defining an operation of the devices. The geometric modeling module comprises an instruction-based model database configured to store instruction-based equipment models, wherein each instruction-based equipment models is associated with a particular device included the subplants and comprises operating points that defines an operation of the particular device, a geometric model generator configured to generate the geometric equipment model using the instruction-based equipment models retrieved from the instruction-based model database, a geometric model merger configured to merge geometric equipment models to generate a geometric subplant model associated with one subplants, and a nearest point analyzer configured to receive a desired operating point and determine, on the geometric subplant model, a nearest operating point relative to the desired operating point.

In some embodiments, the controller further comprises a destination specifier configured to receive the geometric subplant model and determine destinations of an amount of a resource produced by the one or more devices by appointing a portion of the amount to each destination.

In some embodiments, the operating points comprise a plurality of sample points gathered by a real-time data collection process.

In some embodiments, the nearest point analyzer is configured to determine a Euclidean distance value between the desired operating point and each of the plurality of operating points included in the geometric subplant model.

In some embodiments, the nearest point analyzer is further configured to determine the nearest operating point with a minimum Euclidean distance.

Yet another implementation is a method for operating subplants included in a central plant. The method involves obtaining instruction-based equipment models associated with a particular device included the subplants and comprises a plurality of operating points that define an operation of the particular device, generating a geometric equipment model using the operating points from an instruction-based equipment models, merging two or more geometric equipment models to form a geometric subplant model defining an operation the subplants, receiving a desired operating point comprising a load value, determining, relative to the desired operating point, a nearest point on the geometric subplant model, setting the nearest point on the geometric subplant model as an actual operating point, and operating the subplants such that the subplants produce an amount of a resource defined by the actual operating point.

In some embodiments, generating the geometric equipment model comprises using a plurality of time-series data points to generate the geometric equipment model.

In some embodiments, merging the geometric equipment models to form the geometric subplant model further comprises summing each of the operating points included in the geometric equipment models.

In some embodiments, the method further comprises defining destinations of a portion of the amount of a particular resource produced by the subplants by appointing the portion of the amount to each of the destinations, wherein a summation of each portion is the amount of the particular resource.

In some embodiments, determining the nearest point on the geometric subplant model further comprises determining a Euclidean distance value between the desired operating point and each of the operating points included in the geometric subplant model.

In some embodiments, determining the nearest point on the geometric subplant model further comprises determining an operating point with a minimum Euclidean distance value.

In some embodiments, the method further comprises repeating the obtaining, generating, merging, receiving, determining, and setting steps for each of the one or more subplants included in the central plant to determine the actual operating point for each of the one or more subplants.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 8 is a graph illustrating a geometric equipment model, according to an exemplary embodiment.

FIG. 9 is a series of graphs illustrating the merging of two geometric equipment models to form a geometric subplant model, according to an exemplary embodiment.

DETAILED DESCRIPTION

Overview

Figure 1:
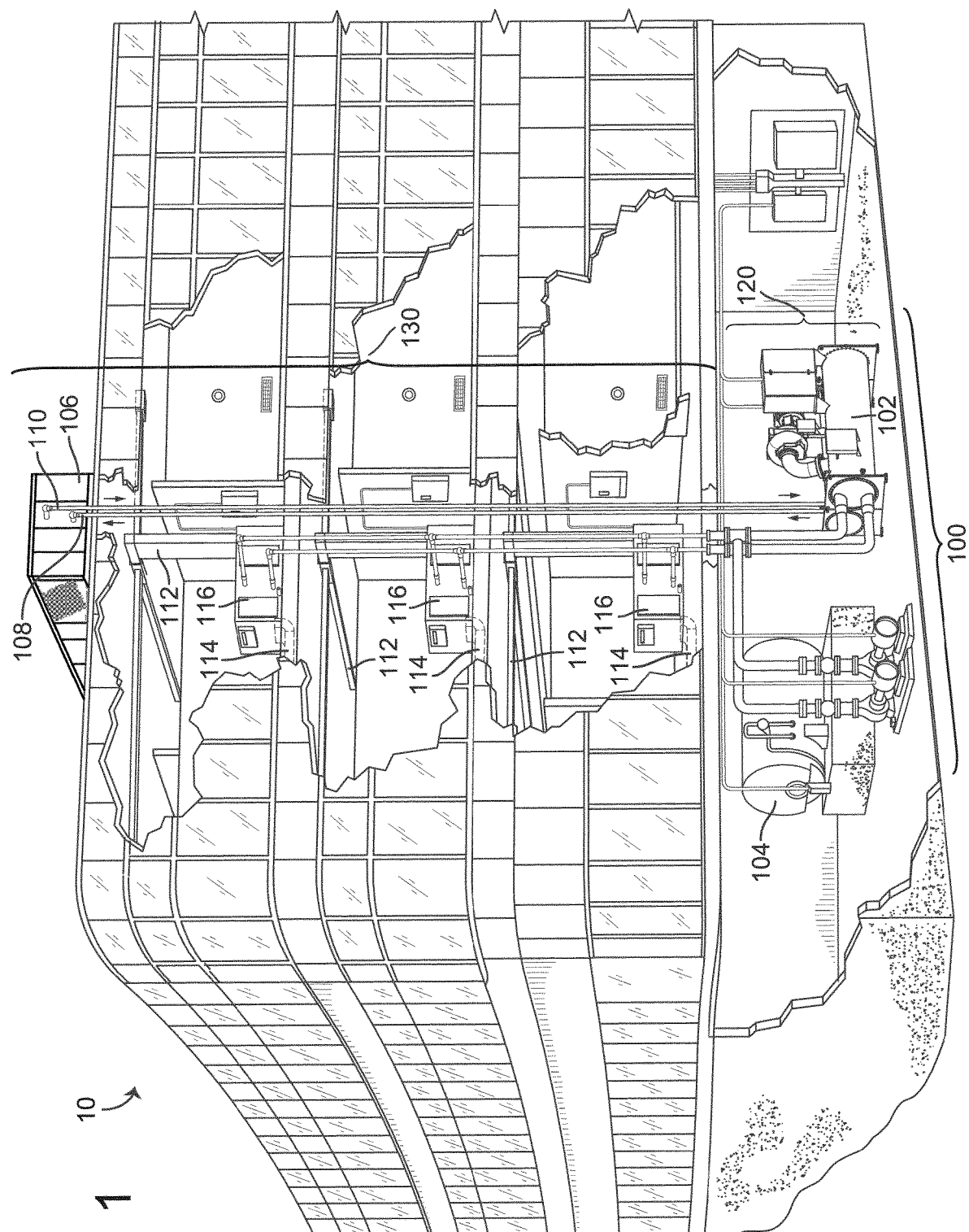
FIG. 1 is a drawing of a building equipped with a HVAC system, according to an exemplary embodiment.

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process to determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period. These and other features of the asset allocator are described in greater detail below.

The central plant controller also includes a geometric modeling module configured to generate a geometric model characterizing the operation of each device included in the central plant, use the generated geometric models to locate a nearest operating point for one or more devices, and output the located nearest operating for use in operating the one or more devices at the nearest operating point, according to some embodiments. Accordingly, the asset allocator communicates with the geometric modeling module to transmit a load allocation. In some embodiments, the geometric modeling module merges two or more geometric equipment models to generate a geometric subplant model defining the operational characteristics of a subplant. In some embodiments, the geometric modeling module merges two or more geometric subplant models to generate a geometric central plant model defining the operational characteristics of the central plant.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
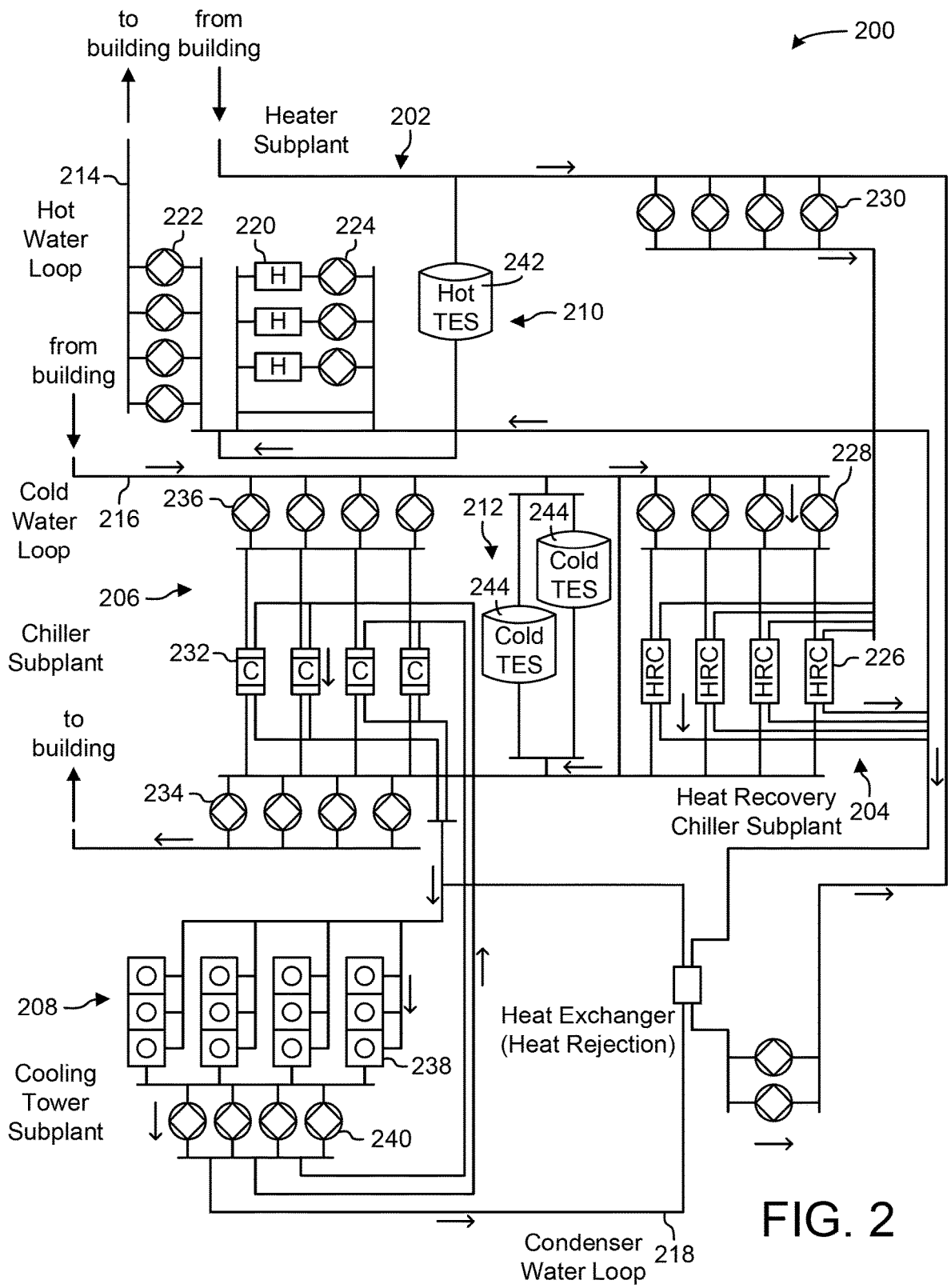
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
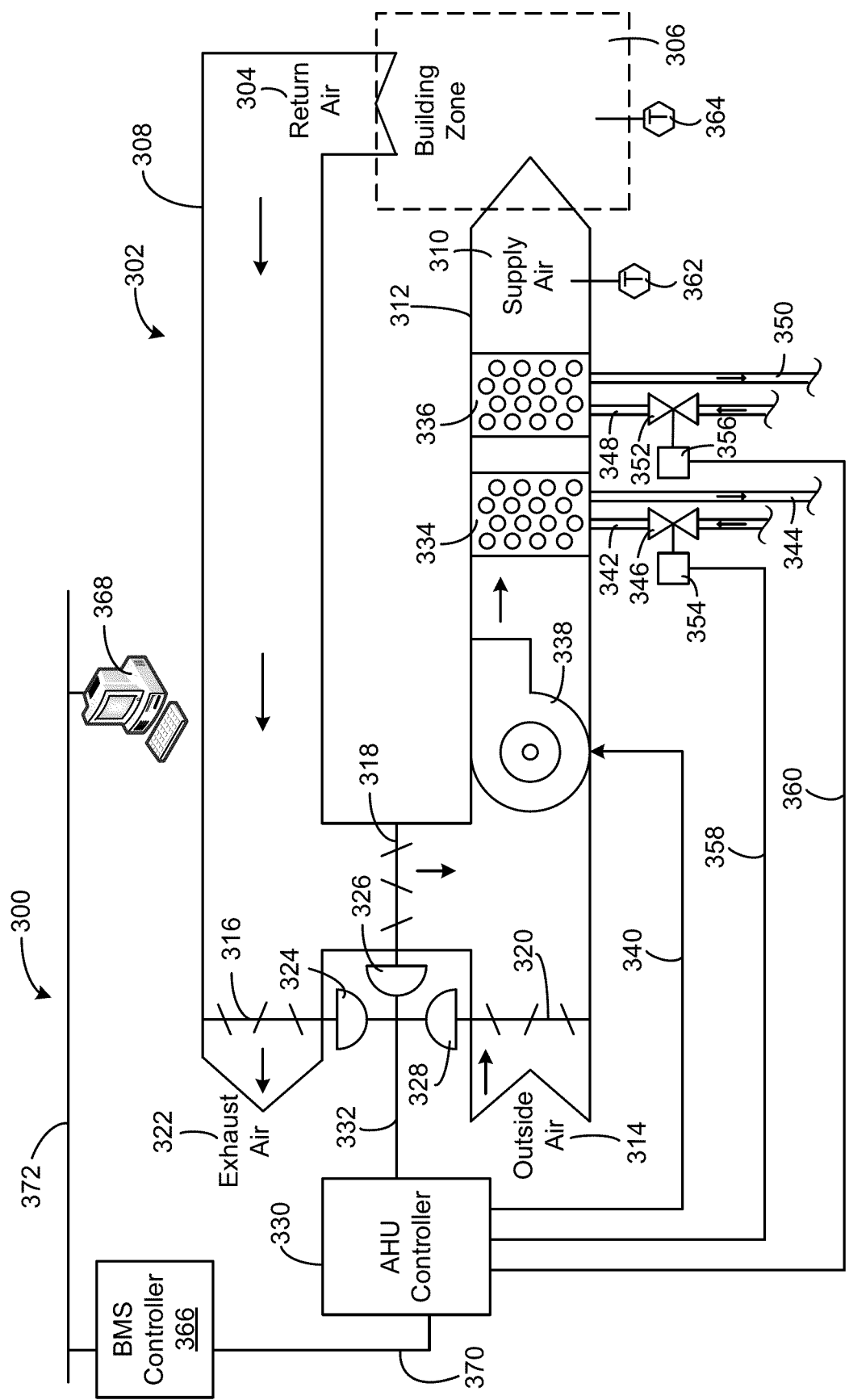
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
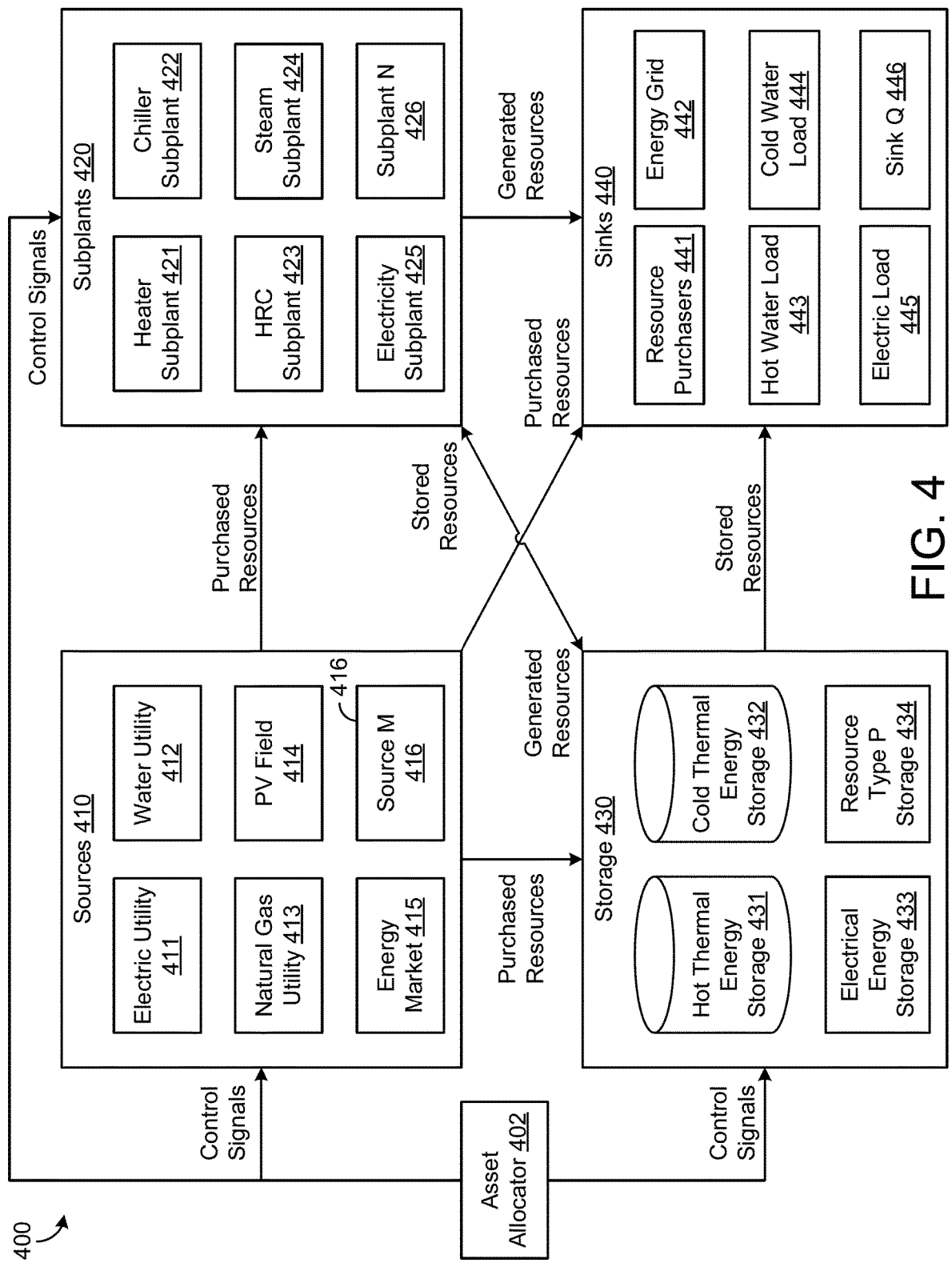
FIG. 4 is a block diagram of an asset allocation system including sources, subplants, storage, sinks, and an asset allocator configured to optimize the allocation of these assets, according to an exemplary embodiment.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7-8) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \forall resources, \forall time \in horizon$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs. The cost optimization performed by asset allocator 402 can be expressed as:

$$\operatorname*{argmin}_{x} J(x)$$

where J(x) is defined as follows:

$$J(x) = \sum_{sources} \sum_{horizon} \mathrm{cost}(purchase_{resource,time}, time) - \sum_{incentives} \sum_{horizon} \mathrm{revenue}(ReservationAmount)$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} purchase_{resource,time} + \\ \sum_{subplants} produces(x_{internal,time}, x_{external,time}, v_{uncontrolled,time}) - \\ \sum_{subplants} consumes(x_{internal,time}, x_{external,time}, v_{uncontrolled,time}) + \\ \sum_{storages} discharges_{resource}(x_{internal,time}, x_{external,time}) - \sum_{sinks} requests_{resource} = \\ 0 \; \forall \, resources, \forall \, time \in horizon$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incentive programs often require the reservation of one or more assets for a period of time. In traditional systems, these assets are typically turned over to alternative control, different than the typical resource price based optimization.

Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Central Plant Controller

Figure 5:
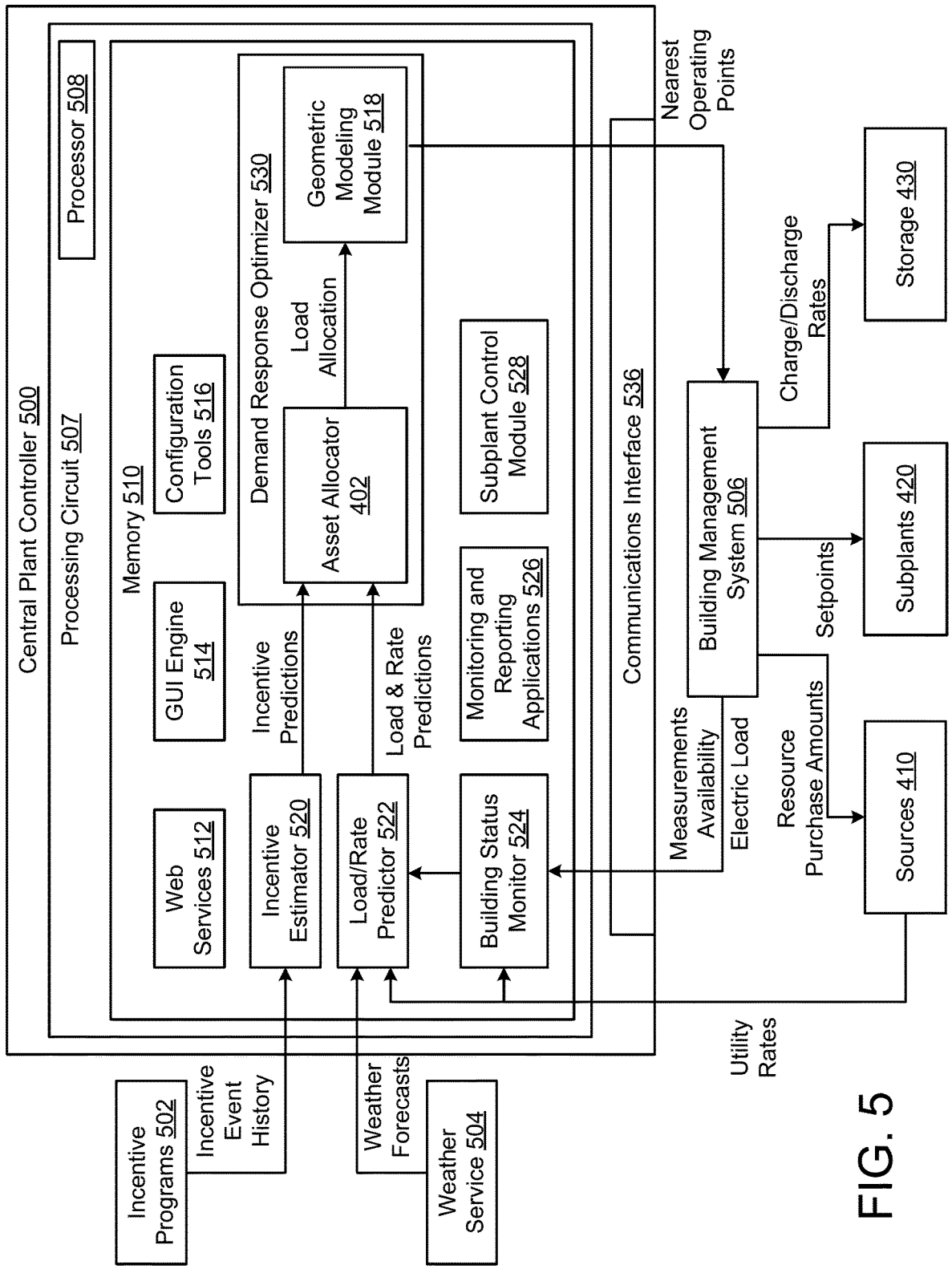
FIG. 5 is a block diagram of a central plant controller in which the asset allocator of FIG. 4 can be implemented, according to an exemplary embodiment.

Referring now to FIG. 5, a block diagram of a central plant controller 500 in which asset allocator 402 can be implemented is shown, according to an exemplary embodiment. In various embodiments, central plant controller 500 can be configured to monitor and control central plant 200, asset allocation system 400, and various components thereof (e.g., sources 410, subplants 420, storage 430, sinks 440, etc.). Central plant controller 500 is shown providing nearest operating points to a building management system (BMS) 506. The nearest operating points provided to BMS 506 are control decisions for use by the BMS 506 to operate the various devices included in the central plant 200.

In some embodiments, BMS 506 is the same or similar to the BMS described with reference to FIG. 1. BMS 506 may be configured to monitor conditions within a controlled building or building zone. For example, BMS 506 may receive input from various sensors (e.g., temperature sensors, humidity sensors, airflow sensors, voltage sensors, etc.) distributed throughout the building and may report building conditions to central plant controller 500. Building conditions may include, for example, a temperature of the building or a zone of the building, a power consumption (e.g., electric load) of the building, a state of one or more actuators configured to affect a controlled state within the building, or other types of information relating to the controlled building. BMS 506 may operate subplants 420 and storage 430 to affect the monitored conditions within the building and to serve the thermal energy loads of the building.

BMS 506 may receive control signals from central plant controller 500 specifying on/off states, charge/discharge rates, and/or setpoints for the subplant equipment. BMS 506 may control the equipment (e.g., via actuators, power relays, etc.) in accordance with the control signals provided by central plant controller 500. For example, BMS 506 may operate the equipment using closed loop control to achieve the setpoints specified by central plant controller 500. In various embodiments, BMS 506 may be combined with central plant controller 500 or may be part of a separate building management system. According to an exemplary embodiment, BMS 506 is a METASYS® brand building management system, as sold by Johnson Controls, Inc.

Central plant controller 500 may monitor the status of the controlled building using information received from BMS5606. Central plant controller 500 may be configured to predict the thermal energy loads (e.g., heating loads, cooling loads, etc.) of the building for plurality of time steps in an optimization period (e.g., using weather forecasts from a weather service 504). Central plant controller 500 may also predict the revenue generation potential of incentive based demand response (IBDR) programs using an incentive event history (e.g., past clearing prices, mileage ratios, event probabilities, etc.) from incentive programs 502. Central plant controller 500 may generate control decisions that optimize the economic value of operating central plant 200 over the duration of the optimization period subject to constraints on the optimization process (e.g., energy balance constraints, load satisfaction constraints, etc.). The optimization process performed by central plant controller 500 is described in greater detail below.

In some embodiments, central plant controller 500 is integrated within a single computer (e.g., one server, one housing, etc.). In various other exemplary embodiments, central plant controller 500 can be distributed across multiple servers or computers (e.g., that can exist in distributed locations). In another exemplary embodiment, central plant controller 500 may have integrated with a smart building manager that manages multiple building systems and/or combined with BMS 506.

Central plant controller 500 is shown to include a communications interface 536 and a processing circuit 507. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between central plant controller 500 and various external systems or devices (e.g., BMS 506, subplants 420, storage 430, sources 410, etc.). For example, central plant controller 500 may receive information from BMS 506 indicating one or more measured states of the controlled building (e.g., temperature, humidity, electric loads, etc.) and one or more states of subplants 420 and/or storage 430 (e.g., equipment status, power consumption, equipment availability, etc.). Communications interface 536 may receive inputs from BMS 506, subplants 420, and/or storage 430 and may provide operating parameters (e.g., on/off decisions, setpoints, etc.) to subplants 420 and storage 430 via BMS 506. The operating parameters may cause subplants 420 and storage 430 to activate, deactivate, or adjust a setpoint for various devices thereof.

Still referring to FIG. 5, processing circuit 507 is shown to include a processor 508 and memory 510. Processor 508 may be a general purpose or specific purpose processor, an application specific integrated circuit (ASIC), one or more field programmable gate arrays (FPGAs), a group of processing components, or other suitable processing components. Processor 508 may be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 may be communicably connected to processor 508 via processing circuit 507 and may include computer code for executing (e.g., by processor 508) one or more processes described herein.

Memory 510 is shown to include a building status monitor 524. Central plant controller 500 may receive data regarding the overall building or building space to be heated or cooled by system 400 via building status monitor 524. In an exemplary embodiment, building status monitor 524 may include a graphical user interface component configured to provide graphical user interfaces to a user for selecting building requirements (e.g., overall temperature parameters, selecting schedules for the building, selecting different temperature levels for different building zones, etc.).

Central plant controller 500 may determine on/off configurations and operating setpoints to satisfy the building requirements received from building status monitor 524. In some embodiments, building status monitor 524 receives, collects, stores, and/or transmits cooling load requirements, building temperature setpoints, occupancy data, weather data, energy data, schedule data, and other building parameters. In some embodiments, building status monitor 524 stores data regarding energy costs, such as pricing information available from sources 410 (energy charge, demand charge, etc.).

Still referring to FIG. 5, memory 510 is shown to include a load/rate predictor 522. Load/rate predictor 522 may be configured to predict the thermal energy loads ($\hat{\ell}_k$) of the building or campus for each time step k (e.g., k=1 . . . n) of an optimization period. Load/rate predictor 522 is shown receiving weather forecasts from a weather service 504. In some embodiments, load/rate predictor 522 predicts the thermal energy loads $\hat{\ell}_k$ as a function of the weather forecasts. In some embodiments, load/rate predictor 522 uses feedback from BMS 506 to predict loads $\hat{\ell}_k$. Feedback from BMS 506 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BMS 506 (e.g., via building status monitor 524). Load/rate predictor 522 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 522 uses a deterministic plus stochastic model trained from historical load data to predict loads $\hat{\ell}_k$. Load/rate predictor 522 may use any of a variety of prediction methods to predict loads $\hat{\ell}_k$ (e.g., linear regression for the deterministic portion and an AR model for the stochastic portion). Load/rate predictor 522 may predict one or more different types of loads for the building or campus. For example, load/rate predictor 522 may predict a hot water load $\hat{\ell}_{Hot,k}$ and a cold water load $\hat{\ell}_{Cold,k}$ for each time step k within the prediction window. In some embodiments, load/rate predictor 522 makes load/rate predictions using the techniques described in U.S. patent application Ser. No. 14/717,593.

Load/rate predictor 522 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 522.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 522 may store the predicted loads, $\hat{\ell}_k$ and the utility rates in memory 510 and/or provide the predicted loads $\hat{\ell}_k$ and the utility rates to demand response optimizer 530.

Still referring to FIG. 5, memory 510 is shown to include an incentive estimator 520. Incentive estimator 520 may be configured to estimate the revenue generation potential of participating in various incentive-based demand response (IBDR) programs. In some embodiments, incentive estimator 520 receives an incentive event history from incentive programs 502. The incentive event history may include a history of past IBDR events from incentive programs 502. An IBDR event may include an invitation from incentive programs 502 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 520 may use the incentive event history to estimate IBDR event probabilities during the optimization period.

Incentive estimator 520 is shown providing incentive predictions to demand response optimizer 530. The incentive predictions may include the estimated IBDR probabilities, estimated participation requirements, an estimated amount of revenue from participating in the estimated IBDR events, and/or any other attributes of the predicted IBDR events. Demand response optimizer 530 may use the incentive predictions along with the predicted loads $\hat{\ell}_k$ and utility rates from load/rate predictor 522 to determine an optimal set of control decisions for each time step within the optimization period.

Still referring to FIG. 5, memory 510 is shown to include a demand response optimizer 530. Demand response optimizer 530 may perform an optimization process to optimize the performance of asset allocation system 400. For example, demand response optimizer 530 is shown to include asset allocator 402 and a geometric modeling module 518. Asset allocator 402 may control an outer (e.g., subplant level) loop of the cascaded optimization. Asset allocator 402 may determine an optimal load allocation for each time step in the prediction window in order to optimize (e.g., maximize) the value of operating asset allocation system 400. Load allocation made by asset allocator 402 may include, for example, load setpoints for each of subplants 420, charge/discharge rates for each of storage 430, and/or resource purchase amounts for each type of resource purchased from sources 410. In other words, the load allocation may define resource allocation at each time step. The load allocation made by asset allocator 402 are based on the statistical estimates of incentive event probabilities and revenue generation potential for various IBDR events as well as the load and rate predictions. The load allocation made by asset allocator 402 are transmitted to geometric modeling module 518 for use in determining nearest operating points of one more devices relative the load allocation.

Geometric modeling module 518 is configured to generate one or more geometric models (e.g., of the devices included in a central plant, of the subplants included in a central plant, of a central plant) and use the generated geometric models to determine, for each time step in a prediction window, a nearest operating point for one or more devices based on the asset allocation generated for each time step by asset allocator 402. As will be described in greater detail below, geometric modeling module 518 stores instruction-based equipment models that define the operational characteristics of one or more device included in a central plant and uses each instruction-based model to generate a geometric model of each device. Further, in some embodiments, the geometric modeling module 518 is configured to use the generated geometric equipment models to generate a geometric subplant model for each subplant included in a central plant. In such embodiments, the geometric subplant model is used to locate a nearest operating point on the geometric subplant model relative an asset allocation determined by asset allocator 402. In turn, a nearest operating point is located on at least one of the geometric equipment models that make up part of the geometric subplant model. It should be understood that the description of geometric modeling module 518 generating geometric equipment models to form a geometric subplant model is intended for exemplary purposes only. In some embodiments, geometric modeling module 518 is configured to generate a conglomerate geometric subplant model using two or more geometric subplant models. As such, geometric modeling module 518 may further be configured to generate geometric models for any device for which an instruction-based equipment model is known.

Still referring to FIG. 5, memory 510 is shown to include a subplant control module 528. Subplant control module 658 may store historical data regarding past operating statuses, past operating setpoints, and instructions for calculating and/or implementing control parameters for subplants 420 and storage 430. Subplant control module 528 may also receive, store, and/or transmit data regarding the conditions of individual devices of the subplant equipment, such as operating efficiency, equipment degradation, a date since last service, a lifespan parameter, a condition grade, or other device-specific data. Subplant control module 528 may receive data from subplants 420, storage 430, and/or BMS 506 via communications interface 536. Subplant control module 528 may also receive and store various information from geometric modeling module 518 such as generated geometric models (e.g., device geometric models, subplant geometric models, etc.) and operating setpoints.

Data and processing results from demand response optimizer 530, subplant control module 528, or other modules of central plant controller 500 may be accessed by (or pushed to) monitoring and reporting applications 526. Monitoring and reporting applications 526 may be configured to generate real time "system health" dashboards that can be viewed and navigated by a user (e.g., a system engineer). For example, monitoring and reporting applications 526 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 5, central plant controller 500 may include one or more GUI servers, web services 512, or GUI engines 514 to support monitoring and reporting applications 526. In various embodiments, applications 526, web services 512, and GUI engine 514 may be provided as separate components outside of central plant controller 500 (e.g., as part of a smart building manager). Central plant controller 500 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 500 may be configured to provide the results of any such processing to other databases, tables, XML files, or other data structures for further querying, calculation, or access by, for example, external monitoring and reporting applications.

Central plant controller 500 is shown to include configuration tools 516. Configuration tools 516 can allow a user to define (e.g., via graphical user interfaces, via prompt-driven "wizards," etc.) how central plant controller 500 should react to changing conditions in the energy storage subsystems. In an exemplary embodiment, configuration tools 516 allow a user to build and store condition-response scenarios that can cross multiple energy storage system devices, multiple building systems, and multiple enterprise control applications (e.g., work order management system applications, entity resource planning applications, etc.). For example, configuration tools 516 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 516 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Geometric Modeling Module

Figure 6:
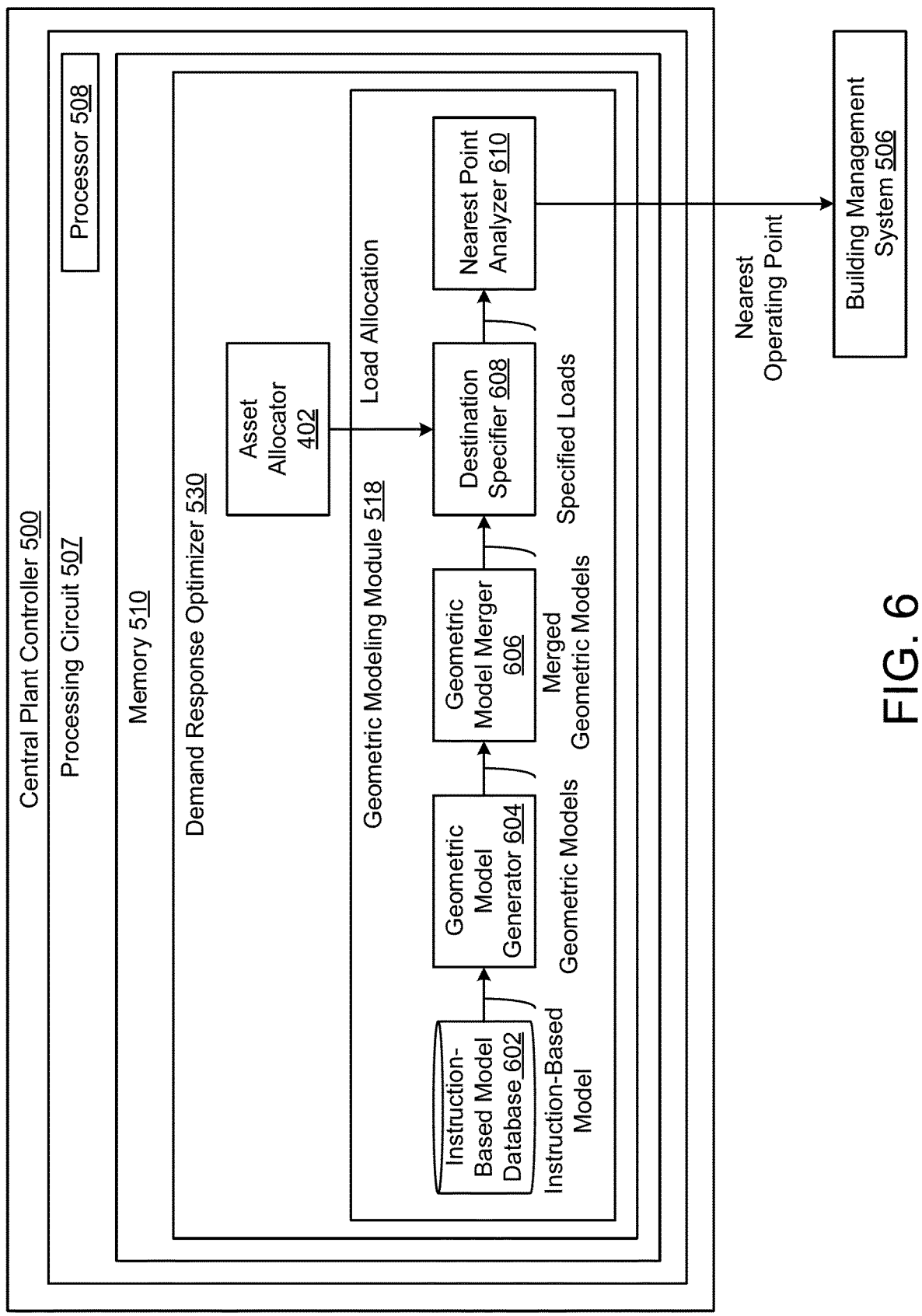
FIG. 6 is a detailed block diagram of a geometric modeling module as implemented in the central plant controller of FIG. 5, according to an exemplary embodiment.

Referring now to FIG. 6, a block diagram illustrating geometric modeling module 518 in greater detail is shown, according to an exemplary embodiment. As previously described, geometric modeling module 518 is configured to generate one or more geometric models (e.g., of the devices included in a central plant, of the subplants included in a central plant, of a central plant) and use the generated geometric models to determine, for each time step in a prediction window, a nearest operating point for one or more devices relative to a subplant load allocation generated for that time step. In some embodiments, geometric modeling module 518 receives the generated subplant load allocation from asset allocator 402.

Geometric modeling module 518 is shown to include an instruction-based model database 602 (herein referred to as IBMD 602), according to some embodiments. IBMD 602 operates as a database configured to store, for each piece of equipment in a central plant, an instruction-based equipment model that characterizes the operation of a particular piece of equipment. The various equipment models stored in IBMD 602 can be added, removed, or otherwise updated based on equipment additions or changes in a central plant. In some embodiments, one or more of the equipment models stored in IBMD 602 are models provided by a manufacturer of one or more individual pieces of equipment. In some embodiments, the equipment models stored in IBMD 602 are comprised of operational data points that are collected in real time to characterize the operation of a piece of equipment. In some embodiments, the equipment models stored in IBMD 602 are functions that characterize the operation of a device. For example, a Gordon-Ng performance model equation may be stored for a chiller device while a number of transfer units (NTU) effectiveness model is stored for a cooling tower. In some embodiments, the equipment models stored in IBMD 602 are models generated from real-time data collection during operation. In some embodiments, IBMD 602 is configured to store previously-generated geometric models. IBMD 602 is configured to output a requested instruction-based model to a geometric model generator 604.

Geometric model generator 604 is shown to receive the requested instruction-based models from IBMD 602, according to some embodiments. As will be described in greater detail with reference to FIGS. 7 and 8, the geometric model generator 604 is configured to use the requested instruction-based equipment model to generate a geometric equipment model for the particular piece of equipment with which the requested instruction-based equipment model is associated. In general, geometric model generator 604 generates a geometric equipment model by using the received instruction-based model associated with a particular device and determines, for each time step in an optimization period, a set of sample data points comprising an independent variable (e.g., load allocation) and one or more dependent variables. Geometric model generator 604 may be configured to generate, for each individual piece of equipment in a central plant, a geometric equipment model. In some embodiments, geometric model generator 604 is configured to generate a new geometric model for a particular device based on changes, removals, or additions of one or more instruction-based models stored in IBMD 602. For example, a new chiller having a different equipment model than one or more other chillers is installed into a central plant. As such, geometric model generator 604 generates a geometric model of the new chiller following installation/storage of the instruction-based model for the new chiller in IBMD 602. Geometric model generator 604 is shown to output the generated geometric models to a geometric model merger 606.

Geometric model merger 606 is shown to receive the generated geometric equipment models from geometric model generator 604. As will be described in greater detail with reference to FIGS. 7-9, the geometric model merger 606 is configured to use the generated geometric equipment models to generate a subplant geometric model by merging two or more generated geometric equipment models. In some embodiments, geometric model merger 606 is configured to label, rename, or otherwise flag a single geometric equipment model as a geometric subplant model comprising only one piece of equipment for which the single geometric equipment model is generated. For example, a chiller subplant includes one chiller device. As such, upon receiving the geometric equipment model for the one chiller device, geometric model merger 606 renames the geometric equipment model for the one chiller device as a geometric subplant model (e.g., geometric model merger 606 does not merge additional geometric equipment models with the geometric equipment model for the one chiller device). Further, in some embodiments, geometric model merger 606 is configured to use the merged geometric equipment models (e.g., a geometric subplant model) to generate a geometric central plant model by merging two or more geometric subplant models. Geometric model merger 606 is shown to output the merged geometric models to a destination specifier 608.

Destination specifier 608 is shown to receive the merged geometric models from geometric model merger 606 and a load allocation for one or more particular time steps in an optimization window. As previously described, the load allocation received by destination specifier 608 may be determined by asset allocator 402 and transmitted to destination specifier 608 as a vector solution, wherein the dimensionality of the vector solution is dependent upon on the number of different types of resources that are produced by a subplant. For example, a chiller subplant operating to produce chilled water will receive a one-dimensional vector solution. In another example, a subplant operating to produce electricity and steam will receive a two-dimension vector solution. As will be described in greater detail below, destination specifier 608 is configured to use the merged geometric models (e.g., geometric subplant models) and the load allocation to determine an amount of the load allocation each consumer of a resource may consume. For example, if a chiller subplant feeds chilled water to two chilled water loads, a specified output amount of chilled water to be feed to each chilled water load may be divided (e.g., equally or non-equally) between the two chilled water loads by destination specifier 608. In some embodiments, a user inputs two or more destinations to divide an amount of the produced resource between. Destination specifier 608 is shown to output the specified loads for each destination of a particular resource to a nearest point analyzer 610.

Nearest point analyzer 610 is shown to receive the specified loads from device specifier 607, according to some embodiments. Nearest point analyzer 610 is configured to determine a nearest operating point relative a desired operating point) defined by the received specified load. In general, nearest point analyzer 610 determines the nearest operating by calculating a Euclidean distance between each operating point located on the geometric model and the desired operating point. The features of nearest point analyzer 610 will be described in greater detail below with reference to FIGS. 7 and 12. Nearest point analyzer 610 is shown to output the determined nearest operating point to BMS system 506 for use in controlling the devices included in the subplants.

Method of Generating and Using Geometric Models to Control Subplants

Figure 7:
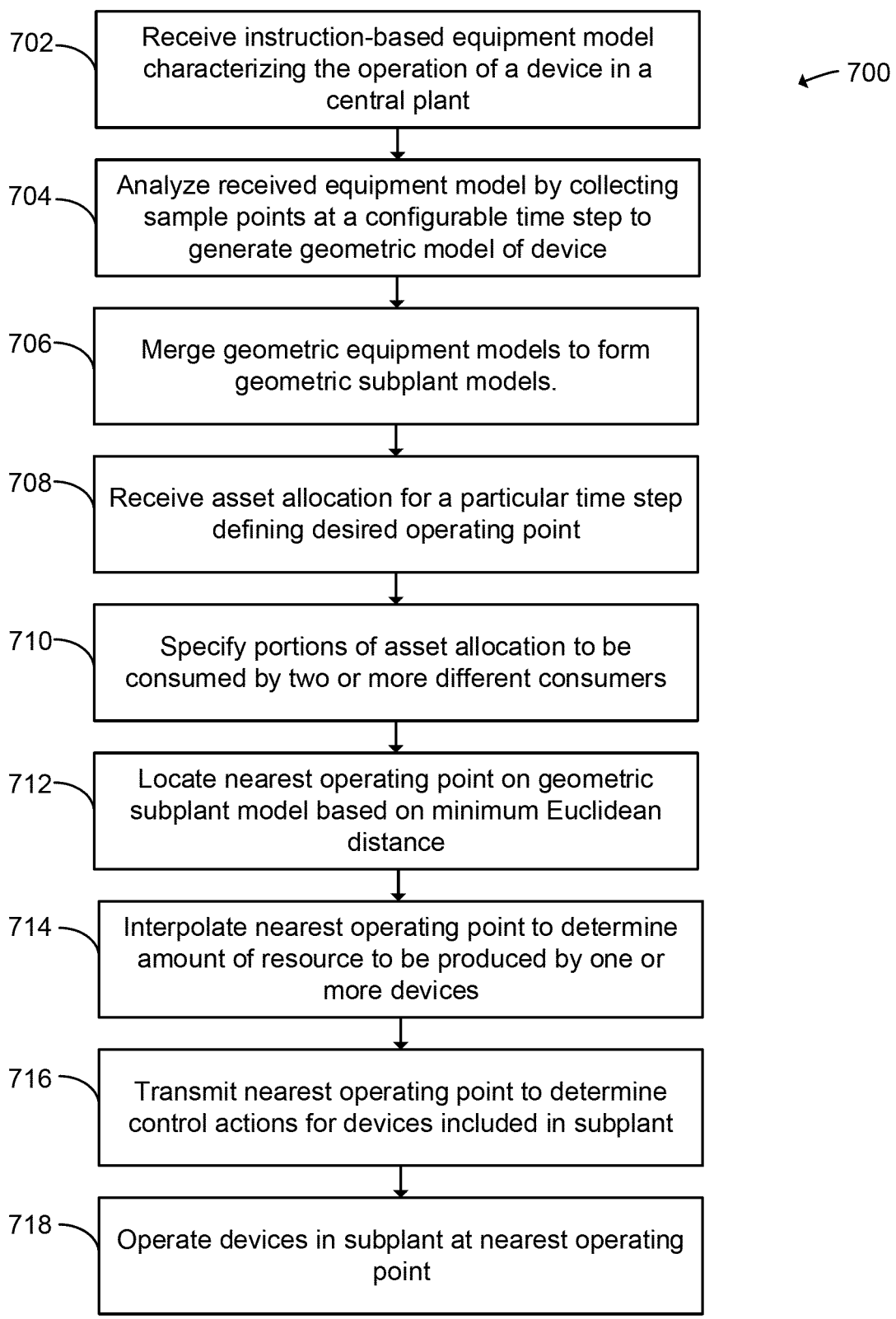
FIG. 7 is a flowchart illustrating a process of generating a geometric model and using the generated geometric model to determine control actions, according to an exemplary embodiment.

Referring now to FIG. 7, a process 700 for generating geometric models and using the geometric models to determine a nearest operating point on a particular geometric model relative a desired operating point is shown, according to some embodiments. In general, process 700 can be performed by geometric modeling module 518 and modules included therein to generate one or more geometric equipment models, merge the one or more geometric equipment models to generate a geometric subplant model, and use the geometric subplant models to determine a nearest operating point for one or more pieces of equipment included in a particular subplant for which the geometric subplant model was created. As will be described below, various steps of process 700 can be repeated for some or all of the subplants (and devices included therein) included in a central plant. Further, various steps of process 700 can repeated for one or more time steps in an optimization period to determine control actions based on the nearest operating point provided by the geometric subplant model.

Process 700 is shown to include receiving an instruction-based equipment model for a device included in a central plant (step 702), according to some embodiments. In some embodiments, the instruction-based equipment model is retrieved from IBMD 602 and transmitted to geometric model generator 604. In general, an instruction-based equipment model can be expressed as:

$$y=f(x,p,c)$$

where y is an array of outputs based on three arrays of inputs, x represents the independent variable to the instruction-based equipment model, p represents one or more dynamic parameters of the instruction-based equipment model, and c represents one or more static constraints of the instruction-based equipment model provided to the instruction-based model equipment model at creation of the instruction-based model. For example, in the case of a Gordon-Ng chiller, the instruction-based equipment model can be expressed as:

$$\frac{T_{ei}}{T_{ci}}\left(1+\frac{1}{COP}\right)-1 = \frac{T_{ei}}{Q_e}\Delta S_T + Q_{leak}\frac{(T_{ci}-T_{ei})}{T_{ci}Q_e} + \frac{RQ_e}{T_{ci}}\left(1+\frac{1}{COP}\right)$$

where the independent variable to the instruction-based equipment model is $Q_e$ (the load allocated to the chiller device), dynamic parameters of the equipment model are $T_{ei}$ and $T_{ci}$ (input temperature of the working fluid such as water, glycol, etc.) entering the evaporator and condenser, respectively, and the static constraint is COP (coefficient of performance of the chiller).

In some embodiments, step 702 involves collecting real-time data points of an operating device. In such embodiments, and as will be described in greater detail below, the real-time data points collected are used to generate one or more operating regions comprising some or all of the real-time data points that characterize the operation of a particular device. An example of real-time data points collected includes a chilled water load produced by a chiller device and the amount of electrical power consumed by the chiller to produce such a load of chilled water.

Process 700 is shown to include analyzing the received instruction-based equipment model by collecting sample points at a configurable time step to generate the geometric equipment model (step 704), according to some embodiments. In some embodiments, the instruction-based equipment model is analyzed by geometric model generator 604. Analyzing the received instruction-based equipment model involves collecting time-series data based on the instruction-based equipment model to generate a set of sample points comprising the independent variable (e.g., chiller cooling load for a chiller device) and the power consumed by a device to produce an amount of the independent variable (e.g., electrical power for a chiller device), according to some embodiments. The time step for which data is configurable based on user preference, model precision/accuracy, equipment run-time, etc. For example, it may desirable to have a shorter time step for a first device whose run-time is less than a second device.

Analyzing the received instruction-based equipment model at step 704 further involves generating a geometric equipment model using the time-series data based on the instruction-based equipment model. In some embodiments, the collected time series data is used to generate an N-dimensional graph where N is the total number of independent variables (e.g., one or more resources produced by a particular device) and dependent variables (e.g., one or more resources consumed by a particular device). For example, a chiller device consumes electrical power (one dependent variables) to produce chilled water (one independent variable) resulting in a two-dimensional geometric equipment model.

Referring now to FIG. 8, a geometric equipment model 802 generated as previously described with reference to step 704 is shown, according to an exemplary embodiment. It should be understood that the type of device associated with geometric equipment model 802 can include any type of device operating in a central plant. For example, geometric equipment model 802 may represent a heat pump model that consumes electrical power (represented by the y-axis) to produce a heat load (represented by the x-axis). As such, the geometric equipment model 802 includes two dimensions based on the total number of resources consumed and produced by the device (i.e., one dimension for each resource). However, as previously described, geometric equipment model 802 can include any number of dimensions based on the total number resources consumed and produce by the device which a particular geometric equipment model represents.

Geometric equipment model 802 is shown to include an operating domain 804 comprising the actual operating points $x_1$, $x_2$, $x_3$ and any points that can be interpolated between the actual operating points $x_1$, $x_2$, $x_3$ (herein referred to as interpolated points). Each of the actual operating points $x_1$, $x_2$, $x_3$ and corresponding interpolated points is an N-dimensional value that characterizes the operation of a device with which geometric equipment model 802 is associated. For example, the device characterized by geometric equipment model 802 contains two dimensions. As such, each of the actual operating points $x_1$, $x_2$, $x_3$ and interpolated points are composed of two values (i.e., electric power and load $Q_x$). The number of sample points collected in a particular time period is configurable based on user preference, equipment type, use-case, etc.

Although operating domain 804 shows to include three data points, any number of actual operating points may be included in operating domain 804. Additionally, the size of operating domain 804 to group the sample points $x_1$, $x_2$, $x_3$ is configurable (e.g., configurable based on user preference, time step between data samples, etc.). In some embodiments, geometric equipment model 802 includes more than one operating domain (e.g., operating domain 804) that groups different actual operating points. For example, geometric equipment model 802 may include an additional operating region (not shown) that is discrete from operating domain 804. An example of establishing operating domains is described in U.S. patent application Ser. No. 15/473,496 filed Mar. 29, 2017, the entire disclosure of which is incorporated by reference herein. Geometric equipment model 802 is also shown to include a non-operating domain 808 including a point $x_0$, according to some embodiments. Non-operating domain 808 may include a point located the origin of the graph (e.g., [0,0]). Such point(s) may define a non-operating point where the particular device or subplant is not operating (e.g., not consuming a resource, not producing a resource).

Process 700 is shown to involve merging two or more geometric equipment models to generate a geometric subplant model that comprises the two or more geometric equipment models (step 706), according to some embodiments. In some embodiments, the two or more geometric equipment models merged in step 706 are associated with devices that produce similar resources (e.g., two or more chiller devices that produce chilled water). In such embodiments, the dimensions of the merged geometric model are substantially equal to the total number of different dimensions provided by the two or more geometric equipment models. In some embodiments, the two or more geometric models merged in step 706 are associated with at least one device that produces a different resource (e.g., a chiller device that produces chilled water is merged with a hot water generator that produces hot water) and/or consumes a different resource. In such embodiments, the number of different independent variables and number of different dependent variables are summed producing an N-dimensional geometric subplant model. In some embodiments, at least one of the dimensions included in the N-dimensional geometric subplant model is the electrical power consumed combined by the one or more devices operating to produce respective independent variables. N can be represented with the following equation:

$$N=D+I$$

where N is the total number of dimensions of the geometric subplant model, D is the number of different dependent variables of the two or more devices being merged to form the geometric subplant model, and I is the number of different independent variables of the two or more devices being merged to form the geometric subplant model.

For example, a heater subplant contains a heat pump device operating to produce an output resource of hot air (e.g., the independent variable of the heat pump device) and a boiler device operating to produce an output resource of hot water (e.g., the independent variable of the boiler device). Each device consumes electrical power to produce its output resource. As such, the geometric subplant model of the heater subplant includes 3 dimensions: electrical power consumed by the heat pump device and the boiler device, hot air load produced by the heat pump device, and the hot water load produced by the boiler device.

Referring now to FIG. 9, an example of merging two geometric equipment models to form a geometric subplant model is shown, according to an exemplary embodiment. FIG. 9 is shown to merge a first geometric equipment model 902 and a second geometric equipment model 904 to form a geometric subplant model 906 characterizing the operation of the subplant that includes a first device associated with the first geometric equipment model 902 and a second device associated with the second geometric equipment model 904. Although FIG. 9 is shown to include two geometric equipment models, it should be understood that any number of geometric equipment models may be merged to form a geometric subplant model.

First geometric equipment model 902 can be associated with any type of device (e.g., chiller, boiler, cooling tower, etc.) included in the subplant for which the geometric subplant model is being generated. Referring to the horizontal axis of first geometric equipment model 902, the first device x is shown to include an independent variable Q which represents a type of resource produced according to the device type of device x (e.g., chilled water for a chiller device, hot water for a boiler device). The vertical axis is shown to include a dependent variable of electric power (e.g., the amount of electric power consumed by device x to produce a particular amount of resource Q). Likewise, second geometric equipment model 904 is shown to be associated with a device y includes the same or substantially similar independent variable Q and dependent variable electrical power. For the purposes of explanation, the device x associated with first geometric equipment model 902 and device y associated with second geometric equipment model 904 are shown to be two discrete devices operating to produce the same resource Q.

First geometric equipment model 902 is shown to include a first operating domain 908 comprising the operating points $x_1$, $x_2$, $x_3$ and any point that can be interpolated between the operating points $x_1$, $x_2$, $x_3$. First geometric equipment model 902 is also shown to include a first nonoperating domain 910. The operating points and corresponding interpolated points collected into the first operating domain 908 will be included in the geometric subplant model 906 to provide solutions in situations where the device x is desired to produce the entirety of the amount defined by Q. Likewise, second geometric equipment model 904 is shown to include a second operating domain 912 comprising the operating points $y_1$, $y_2$, $y_3$ and any point that can be interpolated between the operating points $Y_1$, $y_2$, $y_3$. Second geometric equipment model 904 is also shown to include a second nonoperating domain 914.

In the example illustrated in FIG. 9 and referring particularly to the geometric subplant model 906, the operating points included in first operating domain 908 are summed with the operating points included in the second operating domain 912 to form a total operating domain 916. The total operating domain 916 includes all combinations of summed operating points included in first operating domain 908 and second operating domain 912 (e.g., $x_1+y_1$, $x_1+y_2$, $x_2+y_1$, etc.) and any points that can be interpolated between each summed operating point. In some embodiments, constraints are enforced which limit the number of operating points that are summed. The summation can be expressed with the following equation:

$$x_n+y_m=t_i$$

where $x_n$ is operating point n of device x (e.g., included in first operating domain 908) where n=1: N with N being the total number of operating points included in a particular first operating domain, $y_m$ is operating point m (e.g., included in second operating domain 912) for device y where m=1: M with M being the total number of operating points included in a particular second operating domain, $t_i$ is total operating point i (e.g., included in total operating domain 916), where i=1:I with I being the total number of operating points included in a particular operating domain. Total number of operating points I can be found with the following equation:

$$I = N*M$$

where I is the total number of operating points as previously described, N is the total number of operating points included in a first operating domain, and M is the total number of operating included in a second operating domain. In some embodiments in which constraints are enforced that limit the number of summed operating points, the product of N*M may be less than 1.

Geometric subplant model 906 is shown to include four domains: first operating domain 908 (comprising solutions which require device x to produce the entirety of an amount of resource Q), second operating domain 912 (comprising solutions which require device y to produce the entirety of an amount of resource Q), total operating domain 916 (comprising solutions requiring both device x and device y operating to produce an amount of resource Q), and non-operating domain 918 which defines a solution having no devices operating. As shown by the labeled operating points included in total operating domain 916, the 9 total operating points include each summation combination of all operating points included first operating domain 908 and all operating points included in second operating domain 912.

In some embodiments, the process of merging geometric equipment models associated with two or more devices producing different resources to form a geometric subplant model as previously described can be extended to produce a geometric central plant model that defines the operational characteristics of a central plant. As such, in order to produce a central plant model, two or more geometric subplant models can be merged to form a geometric central plant model.

In some embodiments, two or more subplants are grouped together to form a subplant module defining the group of two or more subplants. In such embodiments, the geometric subplant models associated with the two or more subplants are merged together to form a geometric subplant module model. For example, a hot water subplant may be merged with a chilled water subplant to form a water subplant module. The technique of merging geometric equipment models described with respect to FIGS. 7 and 9 may be used to merge geometric subplant models to generate one or more geometric subplant module model. As such, the one or more geometric subplant module models may be merged to form a geometric central plant. Further, in some embodiments as will be described in greater detail below with reference to FIG. 10, a geometric central plant model may be generated using a combination of geometric subplant module models and geometric subplant models.

Figure 10:
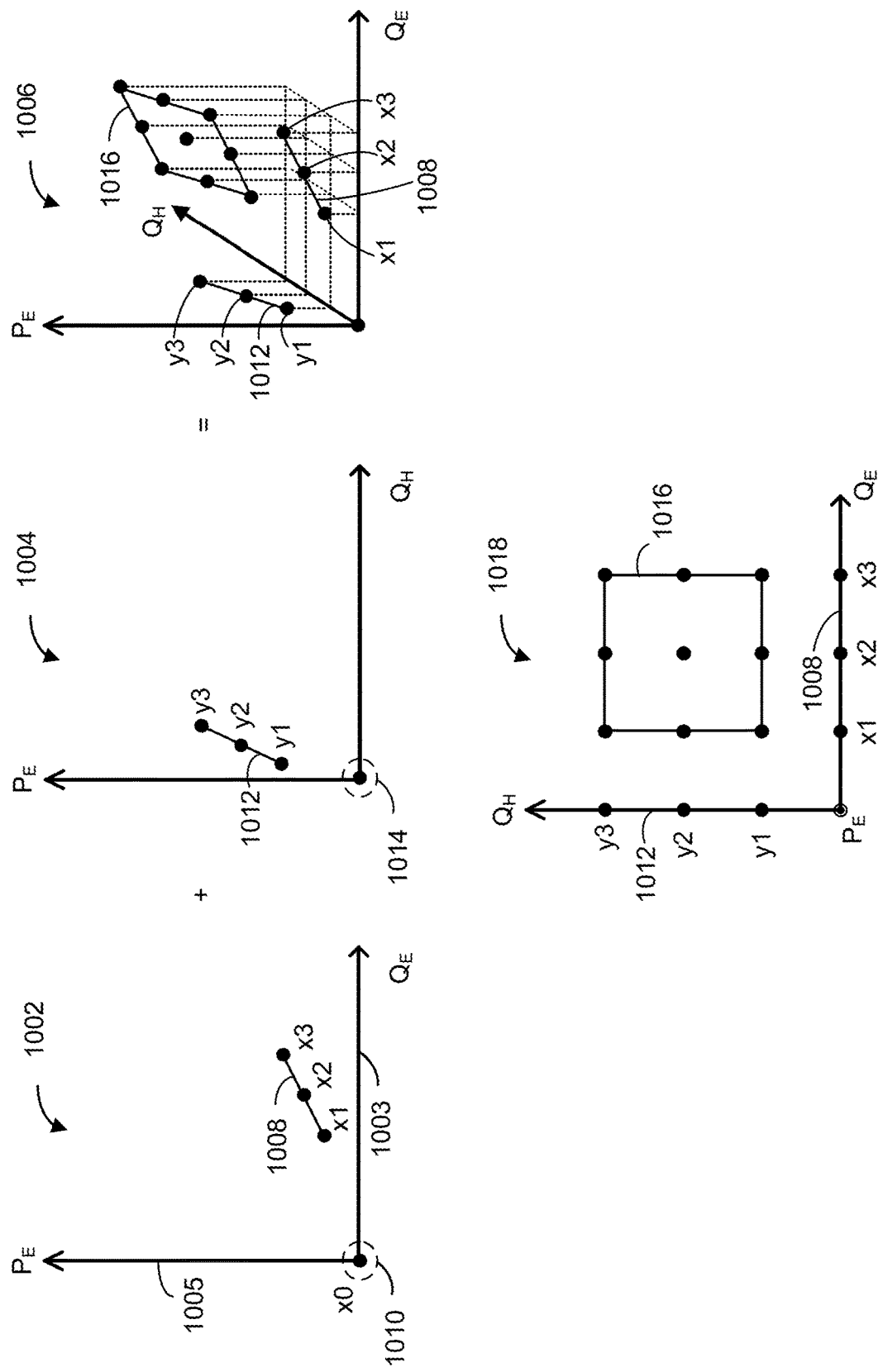
FIG. 10 is a series of graphs illustrating the merging of two geometric subplant models to form a geometric central plant model, according to an exemplary embodiment.

Referring now to FIG. 10, an example of merging two or more geometric subplant models to form a geometric central plant model is shown, according to an exemplary embodiment. FIG. 10 is shown to merge a first geometric subplant model 1002 and a second geometric subplant model 1004 to form a geometric central plant model 1006 characterizing the operation of the central plant that includes a first subplant associated with the first geometric subplant model 1002 and a second subplant associated with the second geometric subplant model 1004. Accordingly, in the embodiment illustrated in FIG. 10, the central plant associated with the geometric central plant model 1006 comprises only two subplants (e.g., a first subplant associated with the first geometric subplant model 1002 and a second subplant associated with the second geometric subplant model 1004).

However, it should be understood that the use of two subplants is for exemplary purposes only and not intended to be limiting. The process of generating a geometric central plant model involves merging more than two geometric subplant models, according to some embodiments. In some embodiments, generating a geometric central plant model involves merging at least one geometric subplant module model.

First geometric subplant model 1002 can be associated with any type of subplant (e.g., heater subplant, chiller subplant, electricity subplant, etc.) included in the central plant for which the geometric central plant model is being generated. Likewise, second geometric subplant model 1004 can be associated with any type of subplant (e.g., heater subplant, chiller subplant, electricity subplant, etc.) and may or may not be substantially similar to the subplant associated with the first subplant associated with first geometric subplant model 1002. As should be understood, the first geometric subplant model 1002 and second geometric subplant model 1004 may have been generated by the geometric modeling module 518 performing step 702-step 708 of process 700. Although first geometric subplant model 1002 and second geometric subplant model 1004 are shown to include two-dimensions, in some embodiments, first geometric subplant model 1002 and second geometric subplant model 1004 include more than two dimensions.

Referring to the horizontal axis 1003 of first geometric subplant model 1002, the first subplant is shown to include an independent variable $Q_e$ which represents a type of resource produced according to the subplant type associated with first geometric subplant model 1002 (e.g., chilled water for a chiller subplant, hot water for a boiler subplant). The vertical axis 1005 of first geometric subplant model 1002 is shown to include a dependent variable of electric power (e.g., the amount of electric power consumed by the first subplant to produce a particular amount of resource Q). Second geometric subplant model 1004 is associated with a second subplant operating to produce a different resource (relative to the first subplant associated with the first geometric subplant model 1002) represented by the independent variable $Q_h$.

First geometric subplant model 1002 is shown to include a first operating domain 1008 comprising the operating points $x_1$, $x_2$, $x_3$ and any points that can be interpolated between operating points $x_1$, $x_2$, $x_3$. First geometric subplant model 1002 is also shown to include a first nonoperating domain 1010. The operating points collected into the first operating domain 1008 will be included in the geometric central plant model 1006 to provide solutions in situations in which the first subplant associated with the first geometric subplant model 1002 is desired to produce an amount defined by $Q_e$ while the second subplant associated with the second geometric subplant model 1004 does not receive an allocation. Likewise, the second geometric subplant model 1004 is shown to include a second operating domain 1012 comprising the operating points $y_1$, $y_2$, $y_3$ and any points that can be interpolated between the operating points $y_1$, $y_2$, $y_3$. The second geometric subplant model 1004 is also shown to include a second nonoperating domain 1014.

In the example illustrated in FIG. 10, the geometric central plant model 1006 is shown to include three dimensions (i.e., a first dimension represented by a first axis $Q_e$, a second dimension represented by a second axis $Q_h$, and a third dimension represented by a third axis $P_e$). As previously described, the number of dimensions included in a geometric central plant model is dependent upon the number of different resources consumed and produced by the two or more geometric subplant models that merged together. For example, the subplant associated with first geometric subplant model 1002 consumes electrical power to produce a resource represented by $Q_e$ while the subplant associated with second geometric subplant model consumes electrical power to produce a resource represented by $Q_h$. Accordingly, the three different resources involved with the two subplants results in the geometric central plant model having three dimensions.

The total operating domain 1016 represents operating points at which both the first subplant associated with first geometric subplant model 1002 and the second subplant associated with the second geometric subplant model 1004 are operating to produce equal or non-equal amounts of their respective resources. The operating points included in the first operating domain 1008 are summed with the operating points included in the second operating domain 1012 to form the total operating domain 1016. The total operating domain 1016 includes all combinations of summed operating points included in first operating domain 1008 and second operating domain 912 (e.g., $x_1+y_1$, $x_1+y_2$, $x_2+y_1$, etc.) and any points that can be interpolated between the summed operating points. Accordingly, the total operating domain 1016 is a surface. A graph 1018 represents a two-dimensional reflection of the total operating domain 1016 onto a plane defined by the horizontal axis 1003 and the vertical axis 1005.

Referring back to FIG. 7, process 700 is shown to involve receiving a load allocation for a particular subplant at a particular time step (step 708), according to an exemplary embodiments. In some embodiments, step 710 involves receiving a load allocation for one or more subplants as determined by asset allocator 402. In some embodiments, the load allocation is received by destination specifier 608. The load allocation is received as a vector and can be represented with the following equation:

$$L_N = \begin{Bmatrix} N_1 \\ N_2 \\ \vdots \\ N_K \end{Bmatrix}$$

where $A_N$ is the load allocation vector at a particular time step, $N_1$ is the load allocation for subplant 1 at a particular time step, $N_2$ is the load allocation for subplant 2 at a particular time step, and $N_K$ is the load allocation for subplant K where the number of subplants range from k=1:K with K being the total number of subplants for which a geometric model was generated at a particular time step.

In some embodiments, each of the load allocation values $N_1:N_K$ is for a particular subplant and is defined by a multidimensional coordinate value (e.g., x, y, z) where the number of dimensions included in the multidimensional coordinate value are substantially the same as the sample points included in the one or more geometric equipment models that were merged to form the geometric subplant model for the particular subplant. In some embodiments, the number of dimensions defining the multidimensional coordinate values of the load allocation are not equal to the dimensions of the sample points. For example, a two-dimensional geometric subplant model with a first dimension defining electric power and a second dimensions defining chilled water load produced receives a one-dimensional load allocation defining only a value of chilled water load produced (e.g., an electric power value is not included as part of the load allocation). In such embodiments, the geometric subplant model is adjusted to remove one or more dimensions that are not defined by the load allocation. For example, with reference to FIG. 10 and relative to the geometric central plant model 1006, the simplified graph 1018 does not include the third dimension (i.e., $P_E$). As a result, the geometric modeling module 518 is able to receive a two-dimensional load allocation and determine the nearest operating point without receiving a value of $P_E$. Upon finding the nearest operating point in the two-dimensional space, geometric modeling module 518 can look to the geometric equipment models (e.g., first geometric subplant model 1002, second geometric subplant model 1004) to determine the electrical power required by the associated devices to produce such a load defined by the nearest operating point.

Still referring to FIG. 7, process 700 is shown to involve specifying a particular amount (e.g., a percentage) of the resource produced to be divided (equally or non-equally) between two or more destinations that are consumers of the produced resource (step 710), according to an exemplary embodiment. In some embodiments, the load allocation is received by destination specifier 608. In some embodiments in which an amount of a particular resource is divided between two or more consumers, destination specifier 608 determines each of the particular amounts of a resource to be divided between two or more consumers. In such embodiments, the total of the divided amounts of a resource are substantially equal to the amount of a resource defined by the received load allocation. In some embodiments in which a subplant only includes one device, step 710 may be skipped. Specifying a load allocation between two or more destinations can be expressed with the following equation:

$$L_t * t_d = P_d$$

where $L_t$ is the total load allocation allocated to a first subplant, $t_d$ is the percentage of the load allocation to be transmitted to consumer d, and $P_d$ is the particular amount of the total load allocation $L_t$ to be transmitted to consumer d where the number of devices range d=1:D with D being the total number of devices in a subplant.

Figure 11:
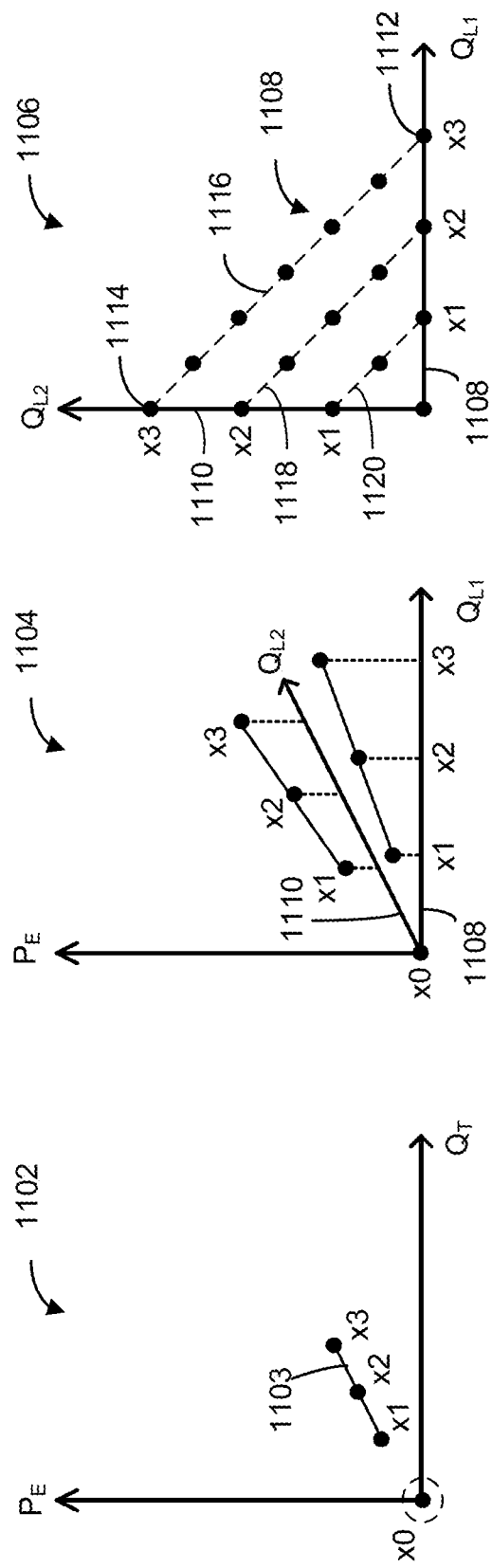
FIG. 11 is a series of graphs illustrating the division of a resource produced by a subplant between two consumers, according to an exemplary embodiment.

Referring now to FIG. 11, various graphs are shown illustrating the process of specifying two destinations for resources produced by a subplant (e.g., step 710 of process 700), according to an exemplary embodiment. A geometric equipment model 1102 illustrates a geometric equipment model for a device (as can be generated with respect to step 704). The geometric equipment model 1102 is shown to include an operating domain 1103 comprising the sample points $x_1$, $x_2$, $x_3$. Each of the sample points define an operating point obtainable by the device or subplant with which the geometric equipment model 802 is associated.

Referring to a second graph 1104, the operating domain 1103 is shown to be applied each to a first destination axis 1108 and a second destination axis 1110, according to some embodiments. The first destination axis 1108 represents an amount of a resource to be portioned to a first destination $L_1$ (e.g., a first consumer of the resource). Accordingly, the second destination axis 1110 represents an amount of a resource to be portioned to a second destination $L_2$ (e.g., a second consumer of the resource). Each of the sample points $x_1$, $x_2$, $x_3$ on the first destination axis 1108 and the second destination axis 1110 represents an entirety of the load defined by the sample points $x_1$, $x_2$, $x_3$ being allocated to the first destination $L_1$ and the second destination $L_2$, respectively.

The divided graph 1106 represents possible solutions for dividing each sample point (e.g., $x_1$, $x_2$, etc.) between a first destination $L_1$ and a second destination $L_2$. As previously described, any point along the first destination axis 1108 represents 100% of the load being allocated to a first destination $L_1$. Accordingly, any point along the second destination axis 1110 represents 100% of the load being allocated to a second destination $L_2$. The points 1112 and 1114 represent 100% of the load defined by $x_3$ being allocated to first destination $L_1$ and second destination $L_2$, respectively. Any point along the line 1116 has a first destination coordinate on the first destination axis 1108 and a second destination coordinate on the second destination axis 1110 that sum to equal to $x_3$. Accordingly, any point along the line 1118 has a first destination coordinate on the first destination axis 1108 and a second destination coordinate on the second destination axis 1110 that sum to equal to $x_2$. As such, any point along the line 1120 has a first destination coordinate on the first destination axis 1108 and a second destination coordinate on the second destination axis 1110 that sum to equal to $x_1$. This relationship can be represented by the following equation:

$$Q_T = Q_{L1} + Q_{L2} + Q_{Ln}$$

where $Q_T$ is the total load, $Q_{L1}$ is the portion of $Q_T$ allocated to a first destination $L_1$, $Q_{L2}$ is the portion of $Q_T$ allocated to a second destination $L_2$, and $Q_{LN}$ is the portion of $Q_T$ allocation to destination Ln, where the number of destinations ranges is n=1:N with N being the total number of destinations.

Referring back to FIG. 7, process 700 is shown to involve locating the nearest operating point on a geometric subplant model (step 712), according to an exemplary embodiment. In some embodiments, locating the nearest operating point involves nearest point analyzer 610 using the load allocation to a particular subplant to determine a nearest operating point on the geometric subplant. In general, the process of locating the nearest operating point on a geometric subplant model involves determining an operating point on a geometric subplant model with the least amount of Euclidean distance between the value defined by the load allocation and the operating point. The Euclidean distance between two points can be represented with the following equation:

$$d(p, q) = \sqrt{\sum_{i=1}^{n} (q_i - p_i)^2}$$

where d(p, q) represents the distance between points p and q, p represents a desired operating point defined by a load allocation, q represents an operating point located on the geometric subplant model, $p_i$ is the ith coordinate of the desired operating point, $q_i$ is the ith coordinate of the actual operating point, and n represents the total number of dimensions included in a model.

Figure 12:
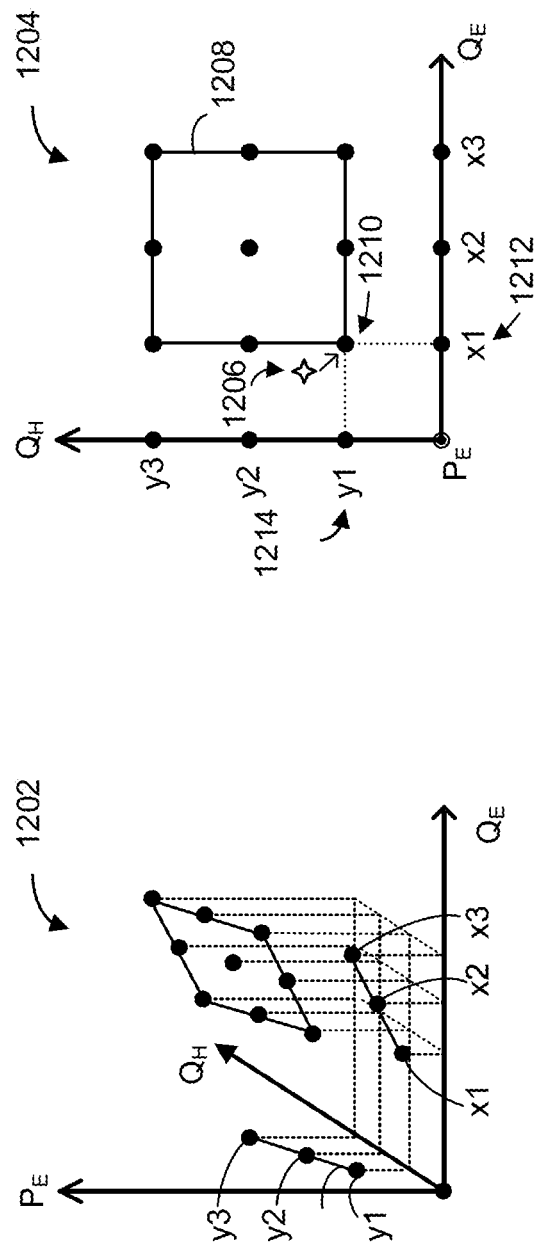
FIG. 12 is a series of graphs illustrating the location of a nearest operating relative a desired operating point, according to an exemplary embodiment.

Referring now to FIG. 12, various graphs are shown illustrating the process of locating a nearest operating point on a geometric subplant model (e.g., step 712 of process 700) relative a desired operating point, according to an exemplary embodiment. A geometric subplant model 1202 generated as previously described is shown. The subplant for which geometric subplant model 1202 is shown to include three dimensions (i.e., $P_E$, $Q_E$, and $Q_H$). In the exemplary scenario illustrated in FIG. 12, the subplant modeled by geometric subplant model 1202 receives a two-dimensional load allocation (e.g., a first dimension being an allocation of $Q_E$ and a second dimension being allocation of $Q_H$). Advantageously, as will be described in greater detail below, based on the two dimensional load allocation received, nearest point analyzer 610 is able to locate a nearest operating point despite the load allocation comprising only two dimensions.

The solution graph 1204 represents a two-dimensional graph comprising a projection of the operating points into the plane defined by the axis $Q_E$ and $Q_H$ (e.g., the third dimension defined by $P_E$ is removed from the graph). Accordingly, solution graph 1204 is able to solve for a nearest point using a load allocation comprising fewer dimensions than the geometric subplant model 1202. Solution graph 1204 is shown to include a desired operating point 1206 comprising a value ($Q_E$, $Q_H$) defined by a load allocation at a particular time step. The nearest point analyzer 610 calculated a Euclidean distance value (using the previously-described equation) between the desired operating point 1206 and each actual operating point on or within the total operating domain 1208. Nearest point analyzer 610 determined, based on the minimum Euclidean distance value calculated, that nearest operating point 1210 is the nearest operating point with the minimum distance between the desired operating point 1206 and the one or more actual operating point points contain on or within the total operating domain 1208.

Referring back to FIG. 7, process 700 is shown to involve interpolating the nearest operating point to determine individual components of the nearest operating point (step 714). In some embodiments, the individual components of the nearest operating point are determined by nearest point analyzer 610. In general, the individual components of the nearest operating point define the amount of the load (as defined by the nearest operating point) that each of the one or more devices included in the subplant will produce. For example, performing step 714 determines that a first chiller device included in a chiller subplant will produce 70% of the load defined by the nearest operating point while a second chiller device will produce 30% of the load.

Referring back to FIG. 12, the first point 1212 represents the amount of the load defined by the nearest operating point 1210 that first device will produce. The second point 1214 represents the amount of the load defined by the nearest operating point 1210 that second device will produce. The first point 1212 and the second point 1214 can be used to determine, on each point's respective equipment mode, the electric power required by the device to produce such a load.

Referring back to FIG. 7, process 700 is shown to involve transmitting the nearest operating point (or individual components of the nearest operating point) for use in operating the one or more devices at the nearest operating point (step 716), according to an exemplary embodiment. Step 716 may involve nearest point analyzer 610 outputting the nearest operating point to BMS 506 for use in controlling the one or more devices at the nearest operating point.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for operating a subplant included in a central plant, the method comprising:
   obtaining one or more instruction-based equipment models, wherein each of the one or more instruction-based equipment models is associated with a particular device included in the subplant and comprises a plurality of operating points that define an operation of the particular device;
   generating, for each of the one or more instruction-based equipment models, a geometric equipment model using the plurality of operating points from a particular one of the one or more instruction-based equipment models, the geometric equipment model defining at least one operating domain associated with the particular device;
   merging two or more geometric equipment models to form a geometric subplant model, the geometric subplant model defining an operation of the subplant comprising one or more devices associated with the one or more geometric equipment models;
   receiving a desired operating point comprising a load value;
   determining, relative to the desired operating point, a nearest operating point on the geometric subplant model;
   setting the nearest operating point on the geometric subplant model as an actual operating point; and
   operating the subplant at the actual operating point for the subplant.

2. The method of claim 1 further comprising repeating the obtaining, generating, merging, receiving, determining, and setting steps for one or more subplants included in the central plant to determine the actual operating point for each of the one or more subplants.

3. The method of claim 1, wherein generating the geometric equipment model comprises using a plurality of time-series data points to generate the geometric equipment model.

4. The method of claim 3, wherein the plurality of time-series data points further comprises grouping data gathered from a real-time data collection process.

5. The method of claim 1, wherein merging the two or more of the geometric equipment models to form the geometric subplant model further comprises summing each operating point included in the one or more geometric equipment models.

6. The method of claim 1, further comprising defining two or more destinations of an amount of a particular resource produced by the subplant by appointing a portion of the amount to each of two or more destinations, wherein a summation of each portion is the amount of the particular resource.

7. The method of claim 1, wherein determining the nearest operating point on the geometric subplant model further comprises determining a Euclidean distance value between the desired operating point and each of the plurality of operating points included in the geometric subplant model.

8. The method of claim 7, wherein determining the nearest operating point on the geometric subplant model further comprises determining an operating point with a minimum Euclidean distance value.

9. A controller for at least one subplant comprising one or more devices, the controller comprising:
   one or more processing circuits comprising one or more processors and memory storing instructions that, when executed by the one or more processors, cause the one or more processors to perform operations comprising:
      generating, for each of the one or more devices included in each of the at least one subplant, a geometric equipment model defining an operation of a particular one of the one or more devices;
      retrieving one or more instruction-based equipment models from an instruction-based model database, wherein each of the one or more instruction-based equipment models is associated with a particular device included in one of the at least one subplant and comprises a plurality of operating points that defines an operation of the particular device;
      generating, for each of the one or more instruction-based equipment models, the geometric equipment model using the one or more instruction-based equipment models retrieved from the instruction-based model database;
      merging at least two geometric equipment models generated by the controller to generate a geometric subplant model, wherein the geometric subplant model is associated with one of the at least one subplant; and receiving a desired operating point and determining, on the geometric subplant model, a nearest operating point relative to the desired operating point.

10. The controller of claim 9, wherein the operations further comprise receiving the geometric subplant model and determining two or more destinations of an amount of a resource produced by the one or more devices by appointing a portion of the amount to each of the two or more destinations.

11. The controller of claim 9, wherein the plurality of operating points comprise a plurality of sample points gathered by a real-time data collection process.

12. The controller of claim 9, wherein the operations further comprise determining a Euclidean distance value between the desired operating point and each of the plurality of operating points included in the geometric subplant model.

13. The controller of claim 12, wherein operations further comprise determining the nearest operating point with a minimum Euclidean distance.

14. A method for operating one or more subplants included in a central plant, the method comprising:
   obtaining one or more instruction-based equipment models, wherein each of the one or more instruction-based equipment models is associated with a particular device included in one of the one or more subplants and comprises a plurality of operating points that define an operation of the particular device;
   generating, for each of the one or more instruction-based equipment models, a geometric equipment model using the plurality of operating points from a particular one of the one or more instruction-based equipment models, the geometric equipment model defining at least one operating domain associated with the particular device;
   merging two or more geometric equipment models to form a geometric subplant model, the geometric subplant model defining an operation of a particular one of the one or more subplants;
   receiving a desired operating point comprising a load value;
   determining, relative to the desired operating point, a nearest point on the geometric subplant model;
   setting the nearest point on the geometric subplant model as an actual operating point; and
   operating at least one of the one or more subplants such that the at least one of the one or more subplants produces an amount of a particular resource defined by the actual operating point.

15. The method of claim 14, wherein generating the geometric equipment model comprises using a plurality of time-series data points to generate the geometric equipment model.

16. The method of claim 14, wherein merging the two or more geometric equipment models to form the geometric subplant model further comprises summing each of the plurality of operating points included in the two or more geometric equipment models.

17. The method of claim 14, further comprising defining two or more destinations of a portion of the amount of a particular resource produced by the one or more subplants by appointing the portion of the amount to each of the two or more destinations, wherein a summation of each portion is the amount of the particular resource.

18. The method of claim 14, wherein determining the nearest point on the geometric subplant model further comprises determining a Euclidean distance value between the desired operating point and each of the plurality of operating points included in the geometric subplant model.

19. The method of claim 18, wherein determining the nearest point on the geometric subplant model further comprises determining an operating point with a minimum Euclidean distance value.

20. The method of claim 14, further comprising repeating the obtaining, generating, merging, receiving, determining, and setting steps for each of the one or more subplants included in the central plant to determine the actual operating point for each of the one or more subplants.

* * * * *